US008495010B2

(12) United States Patent
Moore et al.

(10) Patent No.: US 8,495,010 B2
(45) Date of Patent: Jul. 23, 2013

(54) METHOD AND SYSTEM FOR ADAPTIVE METADATA REPLICATION

(75) Inventors: William H. Moore, Fremont, CA (US); Jeffrey S. Bonwick, Los Altos, CA (US); Matthew A. Ahrens, San Francisco, AZ (US)

(73) Assignee: Oracle America, Inc., Redwood Shores, CA (US)

( * ) Notice: Subject to any disclaimer, the term of this patent is extended or adjusted under 35 U.S.C. 154(b) by 1830 days.

(21) Appl. No.: 11/406,957

(22) Filed: Apr. 19, 2006

(65) Prior Publication Data

US 2007/0118576 A1 May 24, 2007

Related U.S. Application Data

(60) Provisional application No. 60/733,848, filed on Nov. 4, 2005, provisional application No. 60/734,023, filed on Nov. 4, 2005.

(51) Int. Cl.
*G06F 7/00* (2006.01)
*G06F 17/00* (2006.01)

(52) U.S. Cl.
USPC .......................................... 707/610; 707/694

(58) Field of Classification Search
USPC ............................ 707/202, 610, 694, 999.202
See application file for complete search history.

(56) References Cited

U.S. PATENT DOCUMENTS

| 4,144,522 | A | 3/1979 | Kageyama et al. |
|---|---|---|---|
| 5,129,085 | A | 7/1992 | Yamasaki |
| 5,155,847 | A | 10/1992 | Kirouac et al. |
| 5,274,803 | A | 12/1993 | Dubin et al. |
| 5,371,885 | A | 12/1994 | Letwin |
| 5,403,639 | A | 4/1995 | Belsan et al. |
| 5,410,667 | A | 4/1995 | Belsan et al. |
| 5,675,802 | A | 10/1997 | Allen et al. |
| 5,819,292 | A | 10/1998 | Hitz et al. |
| 6,209,111 | B1 | 3/2001 | Kadyk et al. |
| 6,341,341 | B1 | 1/2002 | Grummon et al. |
| 6,536,033 | B1 | 3/2003 | Weerawarana et al. |
| 6,745,284 | B1 | 6/2004 | Lee et al. |
| 6,745,305 | B2 | 6/2004 | McDowell |
| 6,795,966 | B1 | 9/2004 | Lim et al. |
| 6,820,098 | B1 | 11/2004 | Ganesh et al. |
| 6,829,617 | B2 | 12/2004 | Sawdon et al. |
| 6,857,001 | B2 | 2/2005 | Hitz et al. |
| 6,892,211 | B2 | 5/2005 | Hitz et al. |
| 7,007,196 | B2 | 2/2006 | Lee et al. |

(Continued)

OTHER PUBLICATIONS

Octavian Lascu et al, "Configuration and Tuning GPFS for Digital Media Environments", Nov. 2005, IBM International Technical Support Organization, p. 38. Available online: http://www.redbooks.ibm.com/redbooks/pdfs/sg246700.pdf.*

(Continued)

*Primary Examiner* — Brannon W Smith
(74) *Attorney, Agent, or Firm* — Osha Liang LLP

(57) ABSTRACT

A method for writing a data block to a storage pool. The method including receiving a write operation for a block, determining whether the block comprises metadata, and if the block comprises metadata: determining a first replication type for the block, and writing the block to the storage pool in accordance with the first replication type. If the block does not comprise metadata: determining a second replication type for the block and writing the block to the storage pool in accordance with the second replication type.

15 Claims, 8 Drawing Sheets

U.S. PATENT DOCUMENTS

| | | | |
|---|---|---|---|
| 7,032,154 B2 | 4/2006 | Kidorf et al. | |
| 7,039,661 B1 | 5/2006 | Ranade et al. | |
| 7,043,677 B1 | 5/2006 | Li | |
| 7,133,964 B2 | 11/2006 | Rodrigues et al. | |
| 7,162,486 B2 | 1/2007 | Patel et al. | |
| 7,174,352 B2 | 2/2007 | Kleiman et al. | |
| 7,200,715 B2 | 4/2007 | Kleiman et al. | |
| 7,340,640 B1 | 3/2008 | Karr et al. | |
| 2002/0004883 A1 | 1/2002 | Nguyen et al. | |
| 2002/0055942 A1 | 5/2002 | Reynolds | |
| 2002/0087788 A1 | 7/2002 | Morris | |
| 2002/0161972 A1 | 10/2002 | Talagala et al. | |
| 2003/0033477 A1 | 2/2003 | Johnson et al. | |
| 2003/0084242 A1 | 5/2003 | Strange et al. | |
| 2003/0126107 A1 | 7/2003 | Yamagami | |
| 2003/0145167 A1 | 7/2003 | Tomita | |
| 2004/0024973 A1 | 2/2004 | Chron et al. | |
| 2004/0030822 A1 | 2/2004 | Rajan et al. | |
| 2004/0098720 A1 | 5/2004 | Hooper | |
| 2004/0107314 A1 | 6/2004 | Kim et al. | |
| 2004/0123063 A1 | 6/2004 | Dalal et al. | |
| 2004/0143713 A1 | 7/2004 | Niles et al. | |
| 2004/0225834 A1 | 11/2004 | Lu et al. | |
| 2004/0234000 A1 | 11/2004 | Page | |
| 2004/0268068 A1 | 12/2004 | Curran et al. | |
| 2005/0010620 A1 | 1/2005 | Silvers et al. | |
| 2005/0097270 A1 | 5/2005 | Kleiman et al. | |
| 2005/0235154 A1 | 10/2005 | Serret-Avila | |
| 2006/0168409 A1 | 7/2006 | Kahn et al. | |
| 2006/0218644 A1 | 9/2006 | Niles et al. | |
| 2006/0256965 A1 | 11/2006 | Rowe | |
| 2007/0174353 A1* | 7/2007 | Adkins et al. | 707/202 |

OTHER PUBLICATIONS

"An Introduction to GPFs v1.3 for Linux", Jun. 2003. Available online: http://jumpdoc.fz-juelich.de/doc_pdf/gpfs21/GPFs-Linux-wp060303.pdf.*

Sanjay Ghemawat et al, "The Google File System", 2003, ACM, p. 3.*

Sandberg, R. et al.; "Design and Implementation of the Sun Network Filesystem"; Sun Microsystems, Inc., 1985 USENIX Conference (12 pages).

McKusick, M. K. et al.; "A Fast File System for UNIX"; ACM Transaction on Computer Systems, vol. 2, No. 3, Aug. 1984, pp. 181-197 (17 pages).

Astrahan, M.M. et al.; "System R: Relational Approach to Database Management"; ACM Transactions on Database Systems, vol. 1, No. 2, Jun. 1976, pp. 97-137 (41 pages).

"VERITAS File System 3.4 Administrator's Guide" VERITAS Software Corporation, Nov. 2000, http://www.veritas.com; pp. 1-227 (227 pages).

Czezatke C. et al.; "Linlogfs: A Log-Structured Filesystem for Linux"; The USENIX Association, Proceedings of FREENIX Track: 2000 USENIX Annual Technical Conference, San Diego, California, Jun. 18-23, 2000 (13 pages).

Osorio, N. et al.; "Guidelines for Using Snapshot Storage Systems for Oracle Databases"; Oracle Corporation, Oct. 2001 (13 pages).

Quinlan, S.; "A Cached WORM File System"; AT&T Bell Laboratories, Murry Hill, New Jersey; Software-Practice and Experience, vol. 21(12), pp. 1289-1299, Dec. 1991 (11 pages).

Sun StorEdge Instant Image 2.0 System Administrator's Guide; Sun Microsystems, Inc., Feb. 2000, Revision A (106 pages).

Ylonen, T.; "Concurrent Shadow Paging: A New Direction for Database Research"; Laboratory of Information Processing Science, Helsinki University of Technology, SF-02150, Espoo, Finland, 1992 (8 pages).

Popek, G. et al.; "The LOCUS Distributed System Architecture"; The MIT Press, Cambridge, Massachusetts, 1985 The Massachusetts Institute of Technology (8 pages).

Gray, J. et al.; "The Recovery Manager of the System R Database Manager"; Computing Surveys, vol. 13, No. 2, Jun. 1981 (20 pages).

Schilling, J.; "Enrwurf und Implementierung eines schnellen Filesystems fur Unix unter besonderer Berucksichtigung der technischen Parameter optischer Speichermedien und multimedialer Anwendungen"; Diplomarbeir Jorg Schilling, eingereicht am May 23, 1991 an der Tu Berlin, and English Translation (245 pages).

Ylonen, T.; "Concurrent Shadow Paging: Snapshots, Read-Only Transactions, and On-The-Fly Multi-Level Incremental Dumping"; Laboratory of Information Processing Science, Helsinki University of Technology, FIN-02150, Espoo, Finland, 1993 (22 pages).

"The Enterprise Challenge Served by Snapshot"; Whitepaper, 2001 LSI Logic Corporation (8 pages).

Agrawal, R. et al.; "Integrated Concurrency Control and Recovery Mechanisms: Design and Performance Evaluation"; ACM Transactions on Database Systems, vol. 10, No. 4, Dec. 1985, pp. 529-564 (36 pages).

Suresh, Babu S.; "Persistent Snapshots"; Department of Computer Science and Automation, Indian Institute of Science, Bangalore—560 012, Jan. 2000 (38 pages).

"Proceedings of the 5th Annual Linux Showcase & Conference" USENIX Association, Oakland, California, Nov. 5-10, 2001 (11 pages).

Borg, A. et al.; "Fault Tolerance Under UNIX"; ACM Transactions on Computer Systems, vol. 7, No. 1, Feb. 1989, pp. 1-24 (24 pages).

Rosenblum, M. et al.; "The Design and Implementation of a Log-Structured File System"; Electrical Engineering and Computer Sciences, Computer Science Division, Univeristy of California, 1991 (15 pages).

Hecht, M. S. et al.; "Shadowed Management of Free Disk Pages with a Linked List"; ACM Transactions on Database Systems, vol. 8, No. 4, Dec. 1983, pp. 503-514 (12 pages).

Rosenblum, M. et al.; "The LFS Storage Manager" Computer Science Division, Electrical Engineering and Computer Sciences, University of California; presented at the Summer '90 USENIX Technical Conference, Anaheim, California, Jun. 1990 (16 pages).

Lorie, R. A.; "Physical Integrity in a Large Segmented Database"; ACM Transactions on Database Systems, vol. 2, No. 1, Mar. 1977, pp. 91-104 (14 pages).

Austin, B.; "*A Dynamic Disc Allocation Algorithm Designed to Reduce Fragmentation During File Reloading*"; Information Sciences Laboratory, Corporate Research and Development Center, General Electric Company, 1970; pp. 378-381 (4 pages).

Goodheart, B. et al.; "*The Magic Garden Explained*"; Prentice Hall, 1994; pp. 24-25, 29-30, 390-391 (8 pages).

Stallings, W.; "*Computer Organization and Architecture: Designing for Performance*"; Prentice Hall, 2000; pp. 377-378 (4 pages).

Johnson, J. E. et al.; "Overview of the Spiralog File System", Digital Technical Journal, vol. 8, No. 2, 1996, pp. 5-14 (10 pages).

Santry, D. S. et al.; "Deciding When to Forget in the Elephant File System"; 17th ACM Symposium on Operating Systems Principles (SOSP '99), Dec. 1999; pp. 110-123 (14 pages).

Chutani, S. et al., "The Episode File System"; Proceedings of the 1992 USENIX Winter Technical Conference; 1992; (18 pages).

Seltzer, M. L.; "File System Performance and Transaction Support"; University of California at Berkeley, 1992 (131 pages).

Octavian Lascu et al, "Configuration and Tunin GPFS for Digital Media Environments", Nov. 2005, IBM International Technical Support Organization, p. 38. Available online: http://www.redbooks.ibm.com/redbooks/pdfs/sg246700.pdf.

* cited by examiner

METHOD AND SYSTEM FOR ADAPTIVE METADATA REPLICATION

CROSS REFERENCE TO RELATED APPLICATIONS

This application claims benefit of U.S. Provisional Application Ser. No. 60/733,848 filed on Nov. 4, 2005, entitled "MULTIPLE REPLICATION LEVELS WITH POOLED DEVICES" in the names of William H. Moore, Jeffrey S. Bonwick, and Matthew A. Ahrens, which is hereby incorporated by referenced.

This application claims benefit of U.S. Provisional Application Ser. No. 60/734,023 filed on Nov. 4, 2005, entitled "DIRTY TIME LOGGING AND RESILVERING" in the names of William H. Moore and Jeffrey S. Bonwick, which is hereby incorporated by reference.

The present application contains subject matter that may be related to the subject matter in the following U.S. patent applications, which are all assigned to a common assignee: "Method and Apparatus for Self-Validating Checksums in a File System" (application Ser. No. 10/828,573) filed on Apr. 24, 2004; "Method and Apparatus for Dynamic Striping" (application Ser. No. 10/828,677) filed on Apr. 21, 2004; "Method and Apparatus for Vectored Block-Level Checksum for File System Data Integrity" (application Ser. No. 10/828,715) filed on Apr. 21, 2004; "Method and Apparatus for Identifying Tampering of Data in a File System" (application Ser. No. 10/853,874) filed on May 26, 2004; "Method and System for Detecting and Correcting Data Errors Using Checksums and Replication" (application Ser. No. 10/853,837) filed on May 26, 2004; "Method and System for Detecting and Correcting Data Errors Using Data Permutations" (application Ser. No. 10/853,870) filed on May 26, 2004; "Method and Apparatus for Compressing Data in a File System" (application Ser. No. 10/853,868) filed on May 26, 2004; "Gang Blocks" (application Ser. No. 10/919,878) filed on Aug. 17, 2004; "Method and Apparatus for Enabling Adaptive Endianness" (application Ser. No. 10/919,886) filed on Aug. 17, 2004; "Automatic Conversion of All-Zero Data Storage Blocks into File Holes" (application Ser. No. 10/853,915) filed on May 26, 2004; "Multiple Replication Levels with Pooled Devices" (Application Ser. No. 60/733,848) filed on Nov. 4, 2005; "Method and System for Data Replication" Ser. No. 11/434,296 filed on May 15, 2006; Multiple Replication Levels with Pooled Devices" Ser. No. 11/406,956 filed on Apr. 19, 2006; "Method and System Supporting Per-File and Per-Block Replication" Ser. No. 11/406,850 filed on Apr. 19, 2006; and "Ditto Blocks" Ser. No. 11/406,590 filed on Apr. 19, 2006.

BACKGROUND

A typical operating system includes a file system. The file system provides a mechanism for the storage and retrieval of files and a hierarchical directory structure for the naming of multiple files. More specifically, the file system stores information provided by the user (i.e., data) and information describing the characteristics of the data (i.e., metadata). The file system also provides extensive programming interfaces to enable the creation and deletion of files, reading and writing of files, performing seeks within a file, creating and deleting directories, managing directory contents, etc. In addition, the file system also provides management interfaces to create and delete file systems. File systems are typically controlled and restricted by operating system parameters. For example, most operating systems limit the maximum number of file names that can be handled within their file system. Some operating systems also limit the size of files that can be managed under a file system.

An application, which may reside on the local system (i.e., computer) or may be located on a remote system, uses files as an abstraction to address data. Conventionally, this data is stored on a storage device, such as a disk.

Data stored as files in a file system may be replicated using one or more replication schemes. Replication schemes are typically used to enable recover data in the event of file system failures, data corruption, etc. Data replication ensures continuous availability and protection of data stored on disk. The follow is a non-exclusive list of common replication schemes: redundant arrays of independent disks (RAID) schemes, 2-way mirroring, 3-way mirroring, etc.

SUMMARY

In general, in one aspect, the invention relates to a method for writing a data block to a storage pool, comprising receiving a write operation for a block, determining whether the block comprises metadata, and if the block comprises metadata: determining a first replication type for the block, writing the block to the storage pool in accordance with the first replication type, if the block does not comprise metadata: determining a second replication type for the block, and writing the block to the storage pool in accordance with the second replication type.

In general, in one aspect, the invention relates to a system, comprising: a storage pool comprising: a plurality of child blocks, wherein each of the plurality of child blocks comprises one selected from the group consisting of a data block and a metadata block, wherein the metadata block references at least one of the plurality of child blocks, a parent block referencing at least one metadata block, and a storage pool allocator configured to store the parent block and the plurality of child blocks, wherein each metadata block corresponds to one of a plurality of classes of metadata, wherein each metadata block is stored using a replication type corresponding to the one of the plurality of classes of metadata.

In general, in one aspect, the invention relates to a system, comprising: a storage pool comprising: a plurality of child blocks, wherein each of the plurality of child blocks comprises one selected from the group consisting of a data block and a metadata block, wherein the metadata block references at least one of the plurality of child blocks, a parent block referencing at least one metadata block; and a storage pool allocator configured to store the parent block and the plurality of child blocks, wherein each metadata block corresponds to one of a plurality of classes of metadata, wherein each metadata block is stored using a replication type corresponding to the one of the plurality of classes of metadata.

Other aspects of the invention will be apparent from the following description and the appended claims.

DETAILED DESCRIPTION

Figure 1:
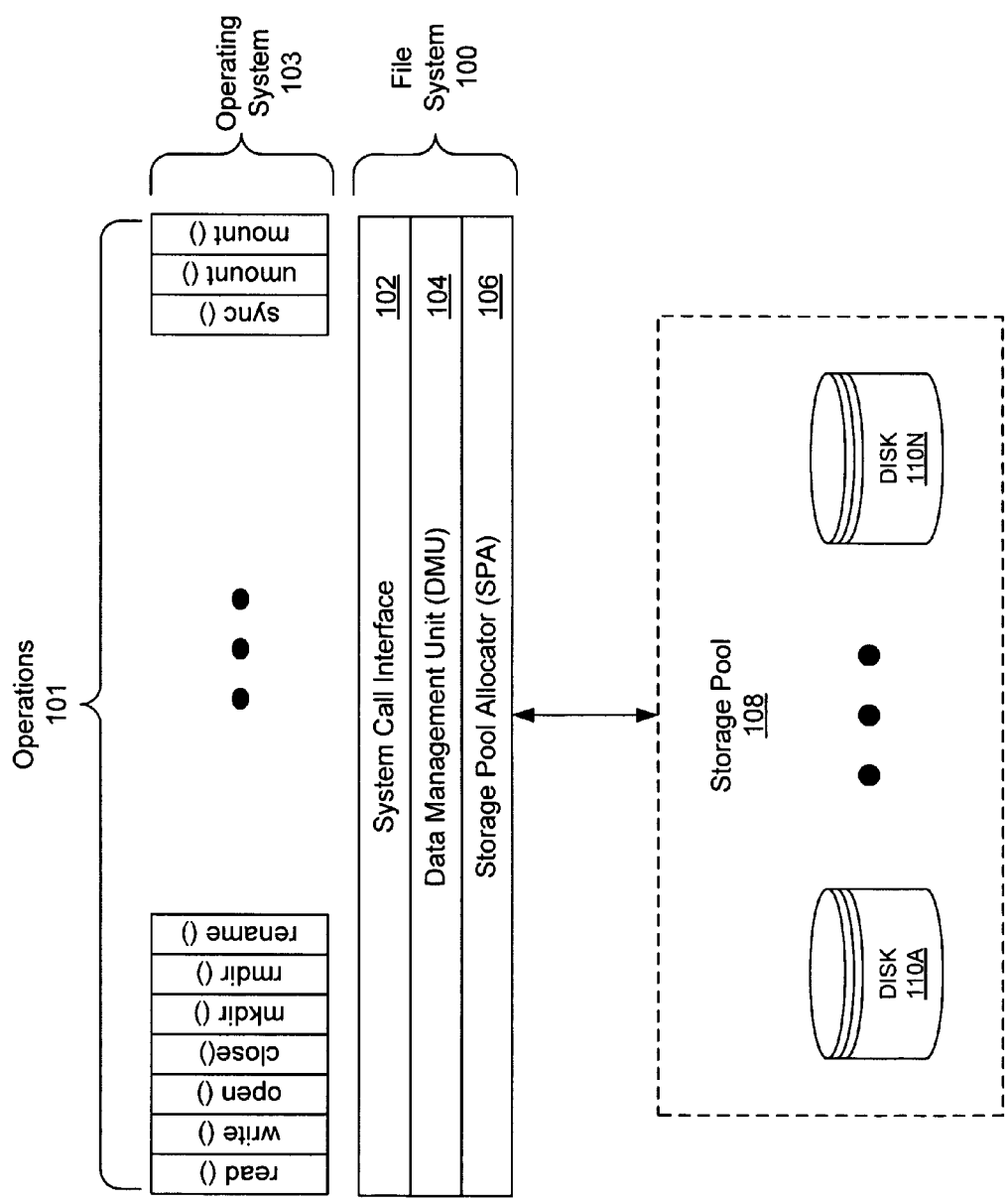
FIG. 1 shows a system architecture in accordance with an embodiment of the invention.

Specific embodiments of the invention will now be described in detail with reference to the accompanying figures. Like elements in the various figures are denoted by like reference numerals for consistency. Further, the use of "ST" in the drawings is equivalent to the use of "Step" in the detailed description below.

In the following detailed description of one or more embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In general, embodiments of the invention relate to data replication. More specifically, embodiments of the invention relate to enabling a file system to replicate data based on the type (or class within a type) of data.

FIG. 1 shows a system architecture in accordance with one embodiment of the invention. The system architecture includes an operating system (103) interacting with a file system (100), which in turn interfaces with a storage pool (108). In one embodiment of the invention, the file system (100) includes a system call interface (102), a data management unit (DMU) (104), and a storage pool allocator (SPA) (106).

The operating system (103) typically interfaces with the file system (100) via a system call interface (102). The operating system (103) provides operations (101) for users to access files within the file system (100). These operations (101) may include read, write, open, close, etc. In one embodiment of the invention, the file system (100) is an object-based file system (i.e., both data and metadata are stored as objects). More specifically, the file system (100) includes functionality to store both data and corresponding metadata in the storage pool (108). Thus, the aforementioned operations (101) provided by the operating system (103) correspond to operations on objects.

More specifically, in one embodiment of the invention, a request to perform a particular operation (101) (i.e., a transaction) is forwarded from the operating system (103), via the system call interface (102), to the DMU (104). In one embodiment of the invention, the DMU (104) translates the request to perform an operation on an object directly to a request to perform a read or write operation at a physical location within the storage pool (108). More specifically, the DMU (104) represents the objects as data blocks and indirect blocks as described in FIG. 3A below. Additionally, in one embodiment of the invention, the DMU (104) includes functionality to group related work (i.e., modifications to data blocks and indirect blocks) into I/O requests (referred to as a "transaction group") allowing related blocks to be forwarded to the SPA (106) together. The SPA (106) receives the transaction group from the DMU (104) and subsequently writes the blocks into the storage pool (108). The operation of the SPA (106) is described in FIG. 2 below.

In one embodiment of the invention, the storage pool (108) includes one or more physical disks (disks (110A-110N)). Further, in one embodiment of the invention, the storage capacity of the storage pool (108) may increase and decrease dynamically as physical disks are added and removed from the storage pool. In one embodiment of the invention, the storage space available in the storage pool (108) is managed by the SPA (106).

Figure 2:
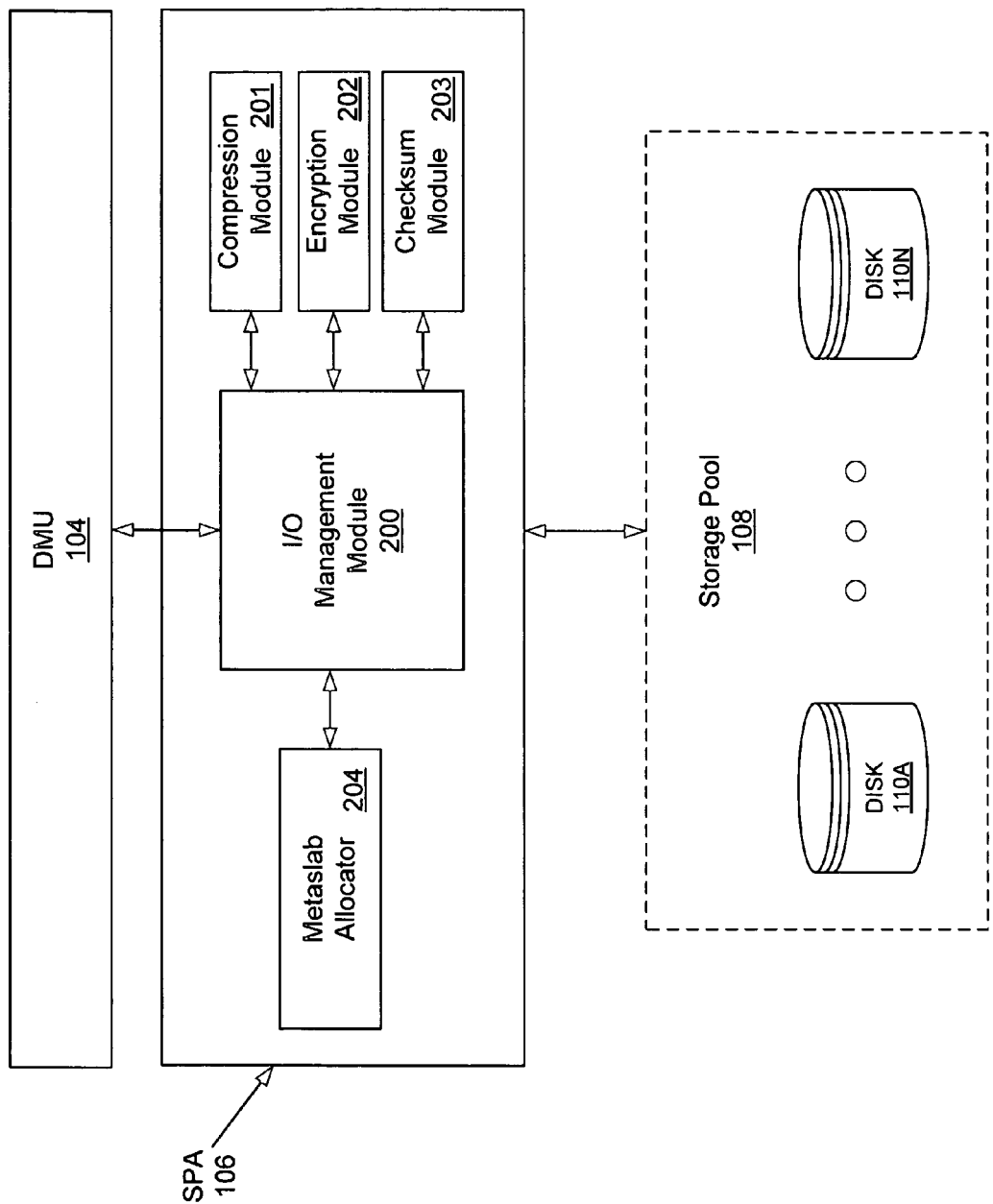
FIG. 2 shows a storage pool allocator in accordance with an embodiment of the invention.

FIG. 2 shows the SPA (106) in accordance with one embodiment of the invention. The SPA (106) may include an I/O management module (200), a compression module (201), an encryption module (202), a checksum module (203), and a metaslab allocator (204). Each of these aforementioned modules are described in detail below.

As noted above, the SPA (106) receives transactions from the DMU (104). More specifically, the I/O management module (200), within the SPA (106), receives transactions from the DMU (104) and groups the transactions into transaction groups in accordance with one embodiment of the invention. The compression module (201) provides functionality to compress larger logical blocks (i.e., data blocks and indirect blocks) into smaller segments, where a segment is a region of physical disk space. For example, a logical block size of 8K bytes may be compressed to a size of 2K bytes for efficient storage. Further, in one embodiment of the invention, the encryption module (202) provides various data encryption algorithms. The data encryption algorithms may be used, for example, to prevent unauthorized access. In one embodiment of the invention, the checksum module (203) includes functionality to calculate a checksum for data (i.e., data stored in a data block) and metadata (i.e., data stored in an indirect block) within the storage pool. The checksum may be used, for example, to ensure data has not been corrupted.

As discussed above, the SPA (106) provides an interface to the storage pool and manages allocation of storage space within the storage pool (108). More specifically, in one embodiment of the invention, the SPA (106) uses the metaslab allocator (204) to manage the allocation of storage space in the storage pool (108).

In one embodiment of the invention, the storage space in the storage pool (108) is divided into contiguous regions of data, i.e., metaslabs. The metaslabs may in turn be divided into segments (i.e., portions of the metaslab). The segments may all be the same size, or alternatively, may be a range of sizes. The metaslab allocator (204) includes functionality to allocate large or small segments to store data blocks and indirect blocks. In one embodiment of the invention, allocation of the segments within the metaslabs is based on the size of the blocks within the I/O requests. That is, small segments are allocated for small blocks, while large segments are allocated for large blocks. The allocation of segments based on the size of the blocks may allow for more efficient storage of data and metadata in the storage pool by reducing the amount of unused space within a given metaslab. Further, using large segments for large blocks may allow for more efficient access to data (and metadata) by reducing the number of DMU (104) translations and/or reducing the number of I/O operations. In one embodiment of the invention, the metaslab allocator (204) may include a policy that specifies a method to allocate segments.

Figure 3A:
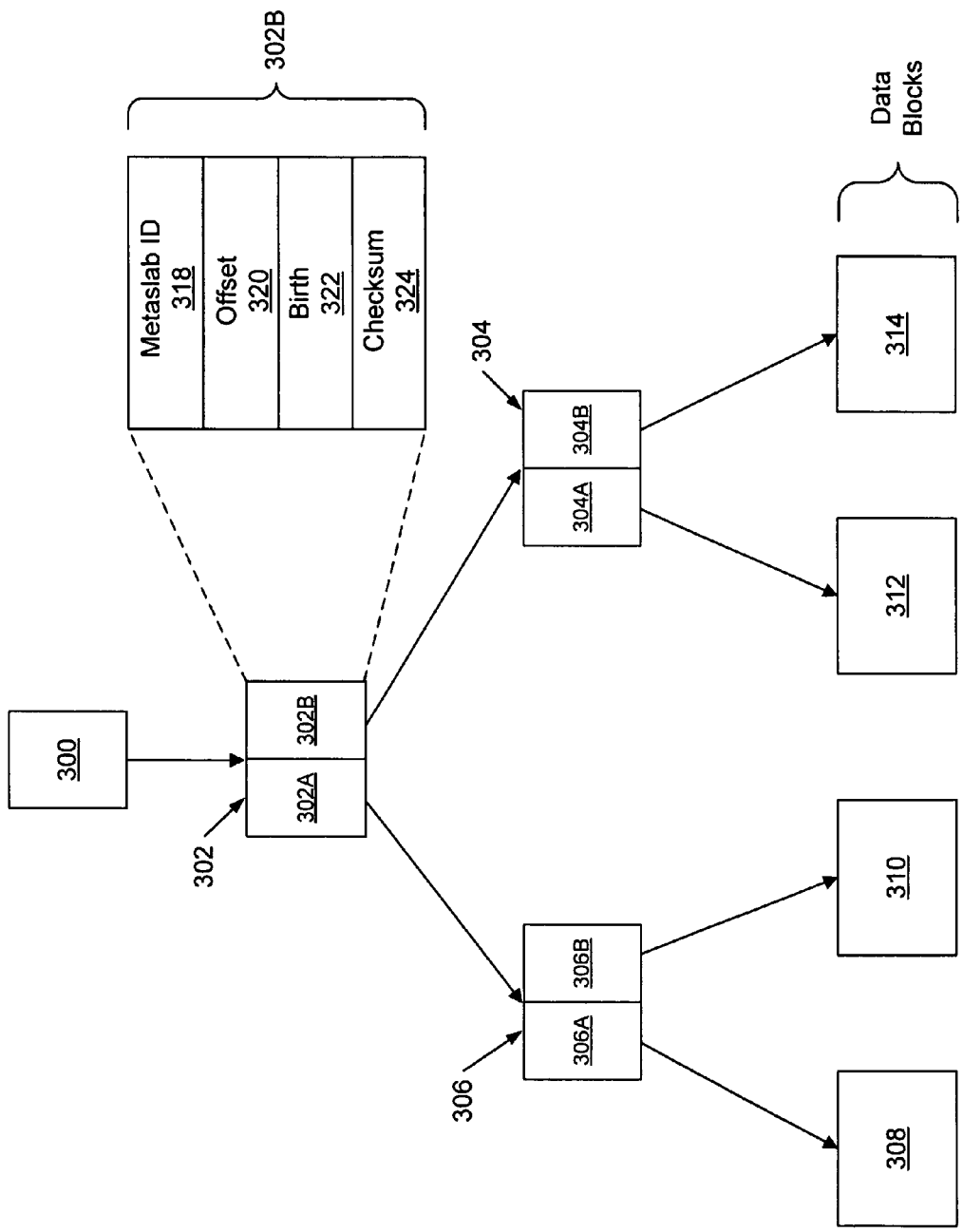
FIGS. 3A-3B shows a hierarchical data configuration for a file system in accordance with an embodiment of the invention.

As noted above, the storage pool (108) is divided into metaslabs, which are further divided into segments. Each of the segments within the metaslab may then be used to store a data block (i.e., data) or an indirect block (i.e., metadata). FIG. 3A shows the hierarchical data configuration (hereinafter referred to as a "tree") for storing data blocks and indirect blocks within the storage pool in accordance with one embodiment of the invention. In one embodiment of the invention, the tree includes a root block (300), one or more levels of indirect blocks (302, 304, 306), and one or more data blocks (308, 310, 312, 314). In one embodiment of the invention, the location of the root block (300) is in a particular location within the storage pool. The root block (300) typically points to subsequent indirect blocks (302, 304, and 306). In one embodiment of the invention, indirect blocks (302, 304, and 306) may be arrays of block pointers (e.g., 302A, 302B, etc.) that, directly or indirectly, reference to data blocks (308, 310, 312, and 314). The data blocks (308, 310, 312, and 314) contain actual data of files stored in the storage pool. One skilled in the art will appreciate that several layers of indirect blocks may exist between the root block (300) and the data blocks (308, 310, 312, 314).

In contrast to the root block (300), indirect blocks and data blocks may be located anywhere in the storage pool (108 in FIG. 1). In one embodiment of the invention, the root block (300) and each block pointer (e.g., 302A, 302B, etc.) includes data as shown in the expanded block pointer (302B). One skilled in the art will appreciate that data blocks do not include this information; rather data blocks contain actual data of files within the file system.

In one embodiment of the invention, each block pointer includes a metaslab ID (318), an offset (320) within the metaslab, a birth value (322) of the block referenced by the block pointer, and a checksum (324) of the data stored in the block (data block or indirect block) referenced by the block pointer. In one embodiment of the invention, the metaslab ID (318) and offset (320) are used to determine the location of the block (data block or indirect block) in the storage pool. The metaslab ID (318) identifies a particular metaslab. More specifically, the metaslab ID (318) may identify the particular disk (within the storage pool) upon which the metaslab resides and where in the disk the metaslab begins. The offset (320) may then be used to reference a particular segment in the metaslab. In one embodiment of the invention, the data within the segment referenced by the particular metaslab ID (318) and offset (320) may correspond to either a data block or an indirect block. If the data corresponds to an indirect block, then the metaslab ID and offset within a block pointer in the indirect block are extracted and used to locate a subsequent data block or indirect block. The tree may be traversed in this manner to eventually retrieve a requested data block.

In one embodiment of the invention, copy-on-write transactions are performed for every data write request to a file. Specifically, all write requests cause new segments to be allocated for the modified data. Therefore, the retrieved data blocks and indirect blocks are never overwritten (until a modified version of the data block and indirect block is committed). More specifically, the DMU writes out all the modified data blocks in the tree to unused segments within the storage pool. Subsequently, the DMU writes out the corresponding block pointers (within indirect blocks) to unused segments in the storage pool. In one embodiment of the invention, fields (i.e., metaslab ID, offset, birth, checksum) for the corresponding block pointers are populated by the DMU prior to sending an I/O request to the SPA. The indirect blocks containing the block pointers are typically written one level at a time. To complete the copy-on-write transaction, the SPA issues a single write that atomically changes the root block to reference the indirect blocks referencing the modified data block.

Figure 3B:
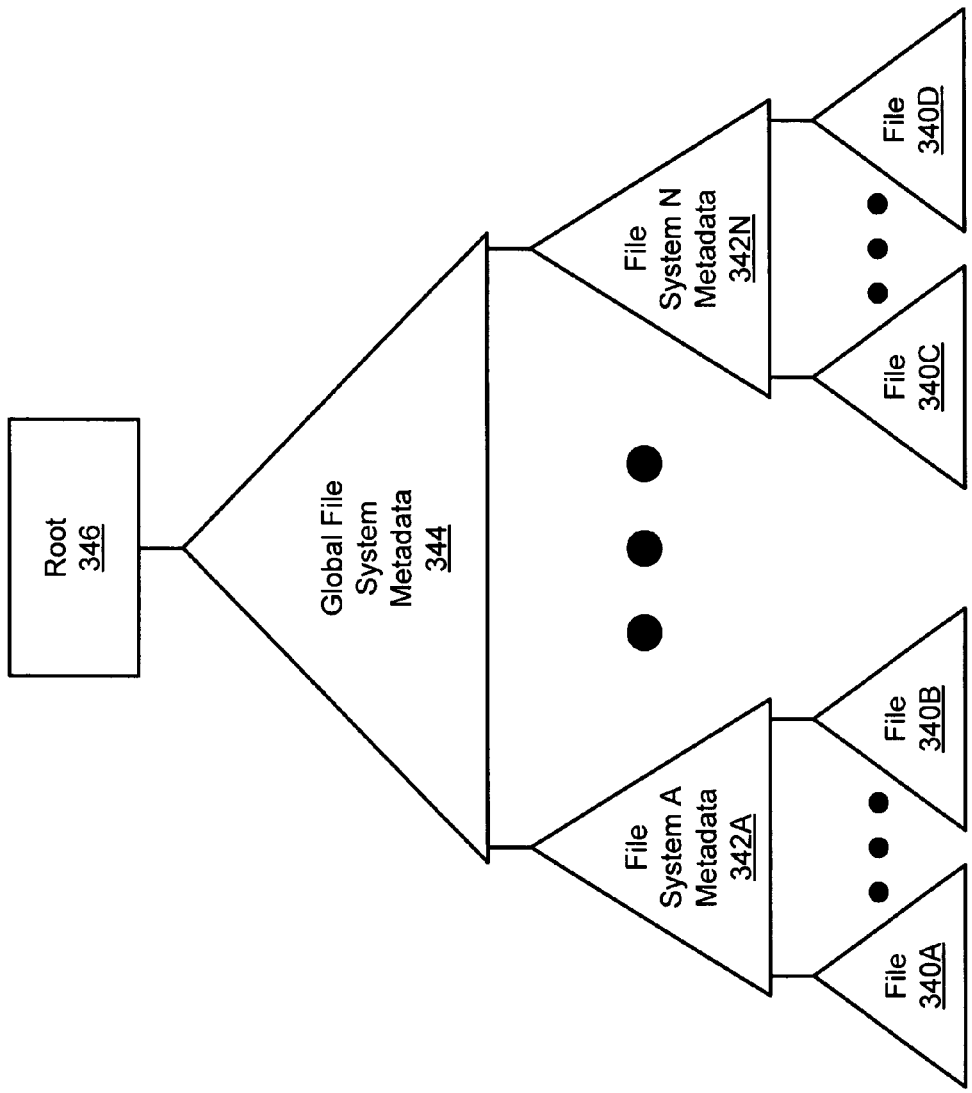

FIG. 3B shows a hierarchical data configured in accordance with one embodiment of the invention. More specifically, FIG. 3B shows a hierarchical data configuration for a storage pool including both metadata and files (i.e., data). As shown in FIG. 3B, all the metadata and data in the storage pool is referenced (directly or indirectly) by a root (346). The root (346) directly references global file system metadata (344). In one embodiment of the invention, the global file system metadata (344) corresponds to metadata associated with the overall storage pool. In one embodiment of the invention, the global file system metadata (344) is organized in a hierarchical tree where the root (346) references the root of the global file system metadata (544) and the leaf nodes of the global file system metadata (344) correspond to root nodes (not shown) of the file system metadata (342A, 342N).

In one embodiment of the invention, the file system metadata (342A, 342N) corresponds to metadata associated with the individual file system. In one embodiment of the invention, the file system metadata (342A, 342N) is organized in a hierarchical tree where the leaf nodes of the file system metadata (342A, 342N) correspond to root nodes (not shown) of the individual files (340A, 340B, 340C, 340D). In one embodiment of the invention, each file is organized in a hierarchical tree structure such as the one shown, for example, in FIG. 3A.

Figure 4:
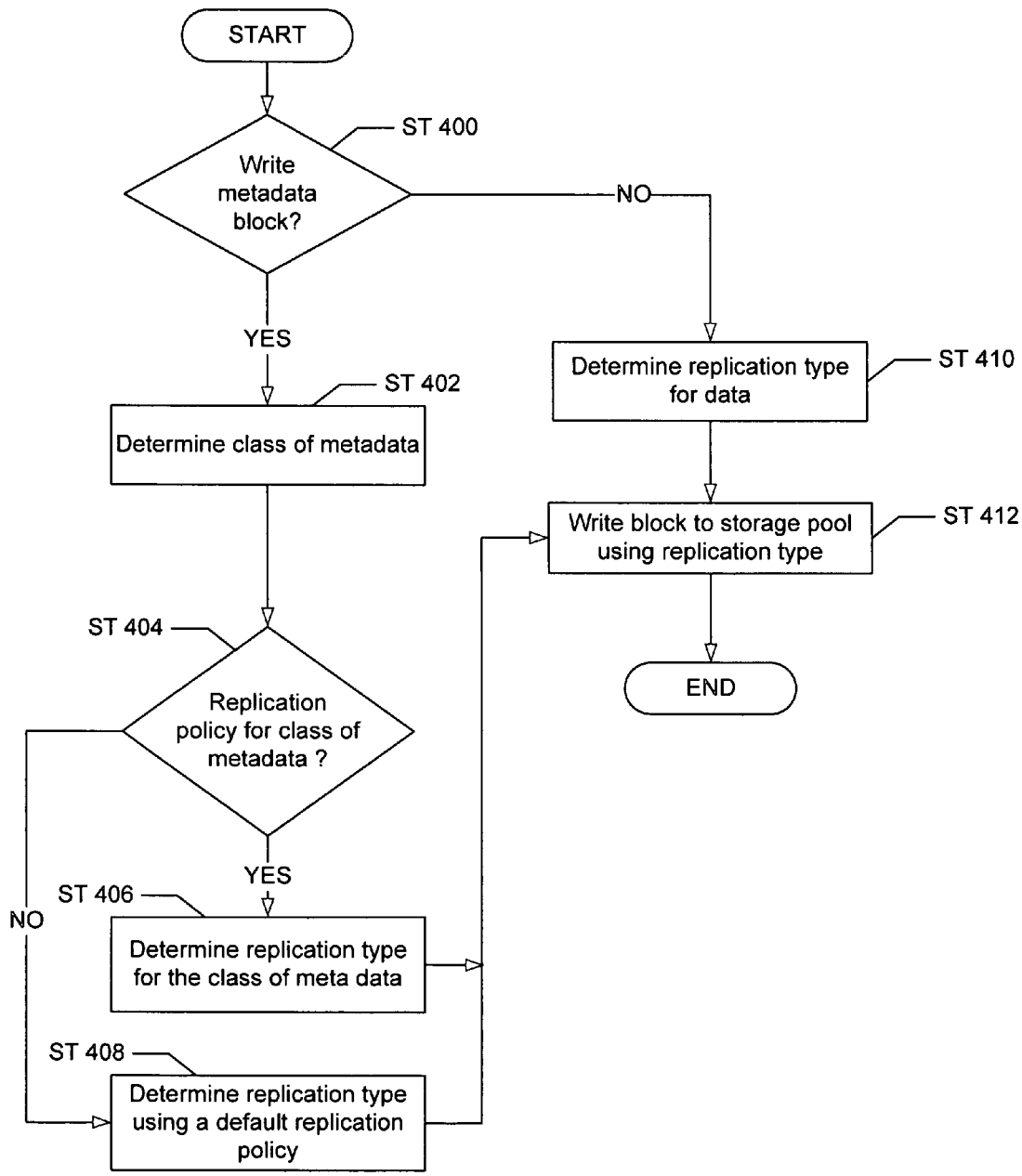
FIGS. 4-5 show flow charts in accordance with an embodiment of the invention.

Using the infrastructure shown in FIGS. 1-3B, the following discussion describes a method for writing metadata (i.e., indirect blocks) using one or more replication schemes. FIG. 4 shows a flow chart for writing a block to disk in accordance with one embodiment of the invention. Initially, a write operation is received (not shown). In one embodiment of the invention, the write operation includes at least one block (e.g., a data block or a metadata block). In one embodiment of the invention, the phrase "metadata block" is used to refer to any block that includes metadata. The following blocks are examples of metadata blocks: (i) the root block (see FIG. 3B), (ii) any block in the global file system metadata (see FIG. 3B); (iii) any block in the file system metadata (see FIG. 3B); and (iv) any indirect block associated with a file (see FIG. 3A). Continuing with the discussion of FIG. 4, upon receiving the write operation, a determination is made about whether the write operation received corresponds to an operation for writing a metadata block to the storage pool (Step 400).

If the write operation corresponds to an operation to write a metadata block to the storage pool, then the class of the metadata block is determined (ST402). Said another way, the metadata block is analyzed to determine which class of metadata the metadata block corresponds to. In one embodiment of the invention, there are four classes of metadata: (i) a root block class, where the root block class includes all storage pool level root blocks (see FIG. 3B), (ii) a global file system metadata class, where the global file system metadata class includes all blocks in the global file system metadata; (iii) a file system metadata class, where the file system metadata class includes all blocks in the file system metadata; and (iv) an indirect block class, where the indirect block class includes all indirect blocks associated with any file in the storage pool (see FIG. 3A).

Those skilled in the art will appreciate that the file system may be divided into classes of metadata in a different manner than the one described above. Further, the granularity of the classes of metadata may be different than the classes of metadata described above.

Continuing with the discussion of FIG. 4, once the class of metadata is determined, a determination is made about whether the class of metadata determined in Step 402 is associated with a replication policy (Step 404). If the class of metadata is associated with a replication policy (e.g., a class-specific replication policy), then the replication type is determined using the replication policy (Step 406). In one embodiment of the invention, the replication policy indicates how the indirect block is to be replicated. For example, the replication policy may specify that the indirect block is to be mirrored (e.g., 2-way mirroring, 3-way mirroring, etc.), replicated using a RAID scheme, a double-wide replication policy, etc.

Further, in one embodiment of the invention, the replication policy is considered to be "class-specific" if it is associated with a subset (i.e., less than all classes of metadata). If the class of metadata is not associated with a replication policy, then the replication type is determined using a default metadata replication policy (Step 408).

In one embodiment of the invention, a replication policy may specify a type of replication (e.g., mirroring, RAID, etc.), and the replication type may more specifically indicate the type of mirroring replication, RAID replication scheme, etc. to use to replicate a block. Alternatively, the replication policy and the replication type may specify the same information (e.g., 2-way mirroring, RAID-5 replication, etc.), where the replication policy is associated with a class of metadata and the replication type is associated with a particular block that is being written to the storage pool.

Once the replication type is determined (using Step 406 or Step 408), the process proceeds to Step 412 (described below).

Returning to Step 400, if the write operation does not correspond to an operation to write metadata (i.e., the write operation corresponds to an operation to write a data block), then the replication type, if any, to use to write the data block is determined (Step 410). Once the replication type is determined, the process proceeds to Step 412.

At Step 412, the block (meta data or data) is written to the storage pool using the replication type. In one embodiment of the invention, ST412 includes allocating a number of physical blocks in the storage pool prior to writing the block to the storage pool (see FIG. 5).

Figure 5:
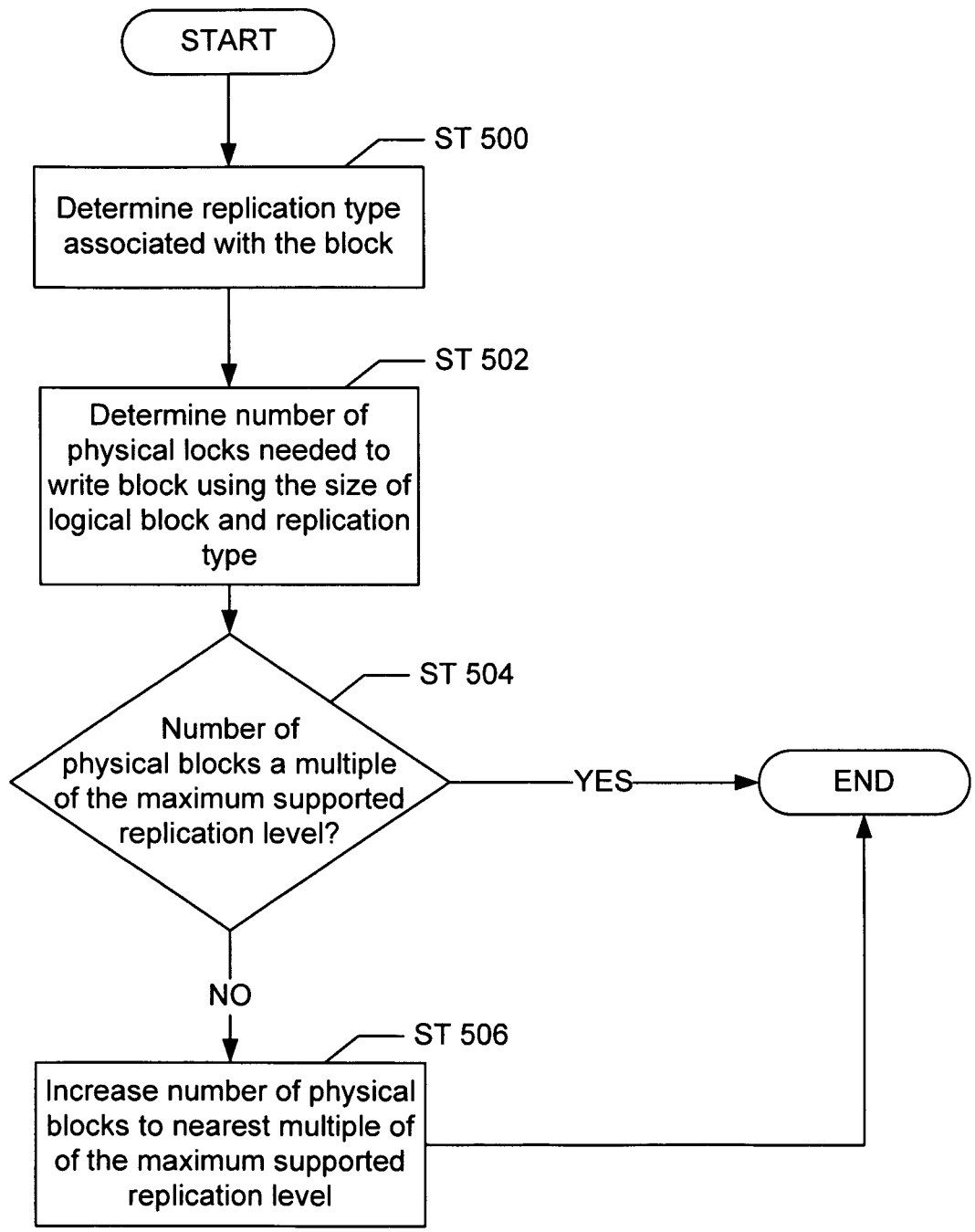

FIG. 5 shows a flow chart showing a method for allocating blocks on disk in accordance with one embodiment of the invention. Specifically, FIG. 5 describes the method corresponding to Step 408 of FIG. 4 in accordance with one embodiment of the invention. Initially, the replication type for the block is determined using the replication policy (Step 500). Subsequently, the number of blocks needed to write the data to disk is computed using the size of the block and the replication type (Step 502). In one embodiment of the invention, the size of data corresponds to the number of physical blocks required to write the block to disk. In one embodiment of the invention, a single block may correspond to more than one physical block (e.g., data block (314) in FIG. 3 may correspond to 1K of data, in which case the single block (314) is actually two physical blocks on disk assuming that each individual physical block is 512 bytes).

In one embodiment of the invention, the number of blocks to allocate is computed as a function of the physical size of the data and the replication type used to write the block to disk. For example, if the block is to be written to disk using RAID a scheme, then the number of physical blocks to allocate is determined by summing the number of physical blocks required to write the block into the storage pool and an appropriate number of parity blocks (i.e., physical blocks used to store parity data associated with one or more of the physical blocks). Alternatively, if the size of the block is 2K and the replication type is three-way mirroring, then twelve physical blocks would be allocated in the storage pool. Those skilled in the art will appreciate that some blocks in the storage pool may not be replicated, in which case physical blocks allocated on disk would correspond directly to the size of the block.

At this stage, the number of physical blocks that need to be allocated has been determined, however, the number of physical blocks that need to be allocated may need to be increased to prevent (or mitigate) fragmentation in file system. To determine if the number of physical blocks that need to be allocated is sufficient, a determination is made about whether the number of physical blocks determined in Step 502 is a multiple of the maximum supported replication level. (Step 504). If the number of physical blocks determined in Step 502 is a multiple of the maximum supported replication level, then the process ends. However, if the number of physical blocks determined in Step 502 is not a multiple of the maximum supported replication level, then the number of physical blocks determined in Step 502 is increased until the number of physical blocks is a multiple of the maximum supported replication level. In one embodiment of the invention, the additional physical blocks added in Step 506 correspond to padding physical blocks (e.g., blocks that contain all zeros).

In one embodiment of the invention, the maximum supported replication level is determined when the file system is initially configured (or soon thereafter). Further, in one embodiment of the invention, the default maximum supported replication level is 2-way mirroring. Thus, the number of physical blocks determined in Step 502 (or after Step 506) must be a multiple of 2. However, if the maximum supported replication level is greater than 2-way mirroring, for example, 3-way mirroring, then the number of physical blocks determined in Step 502 (or after Step 506) must be a multiple of 3. The skilled in the art will appreciate that any replication type may be used and that the aforementioned examples of maximum supported replication level are not intended to limit the scope of the invention.

Figure 6:
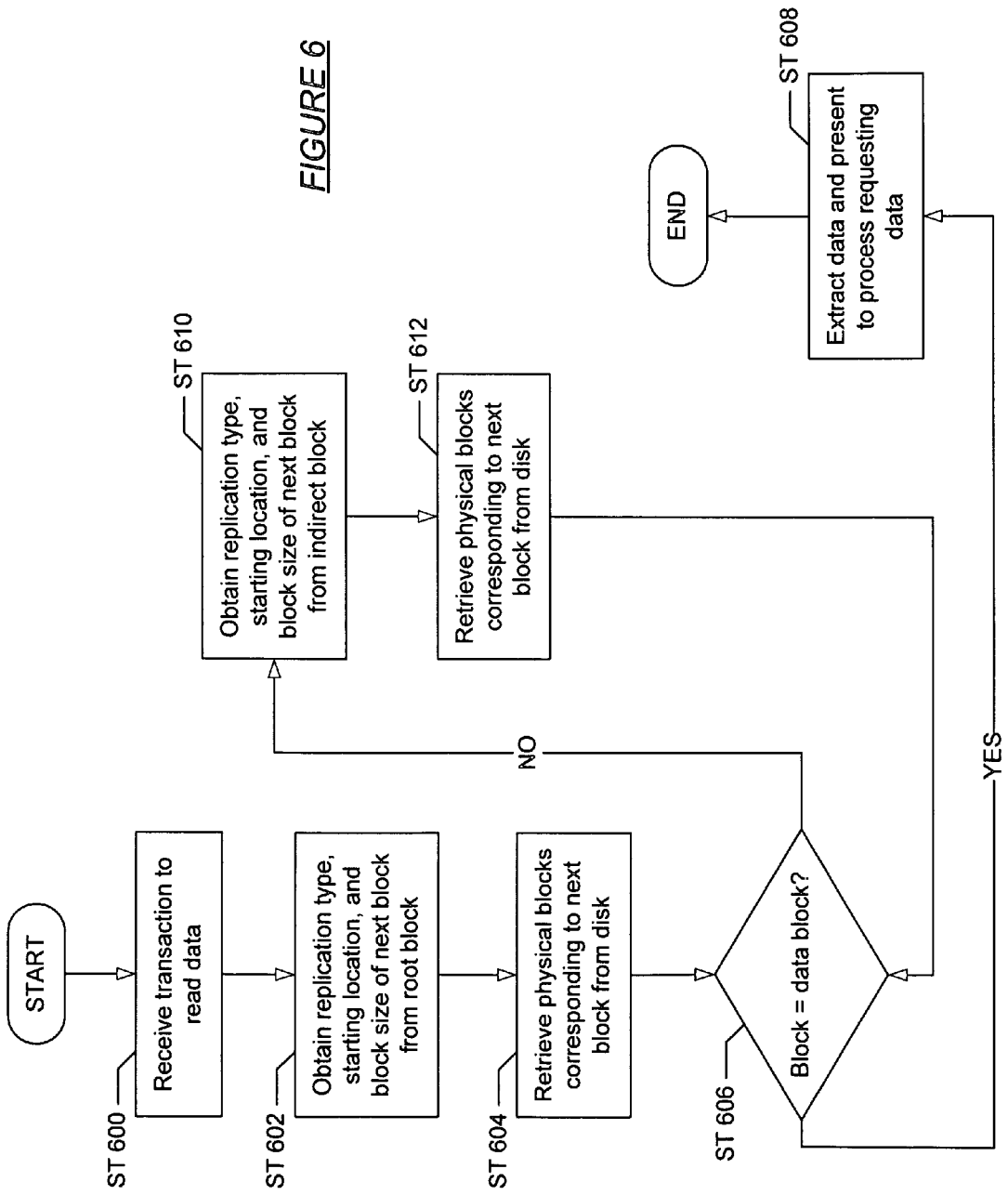
FIG. 6 shows a flow chart for reading metadata logical block in accordance with an embodiment of the invention.

Although the aforementioned description of the invention has been focused on writing data using various types of replication policies, those skilled in the art will appreciate that the replication type and the number of blocks allocated to write data also affects the manner in which data is read and retrieved from disk. FIG. 6 shows a flow chart for reading data in accordance with one or more embodiments of the invention.

Initially, a transaction to read data is received (Step 600). Subsequently, the replication type, starting location (i.e., the metaslab ID and offset), and the block size of the next block is obtained from the root block (Step 602). That is, the block pointer of the root block is obtained and read to determine the location, size, and replication type of the block referenced by the root block. The block size stored in the block pointer of a block indicates the actual size of the data corresponding to the next block. In other words, because the block size of data may be different than the number of blocks allocated to store the data (e.g., due to a replication type), the block size is required to determine where the data stops on disk (i.e., how many blocks actually need to be retrieved beginning with the starting location of the data). Next, the physical blocks corresponding to the next block are retrieved from disk (Step 604). Those skilled in the art will appreciate that not all of the physical blocks associated with the next block need to be retrieved if the next block was stored using a replication scheme. In such cases, only a subset of all physical blocks corresponding to the next block need to be retrieved.

Further, those skilled in the art will appreciate that if the block is compressed, then the block pointer referencing the next block will also include a physical size field. The physical size field corresponds to the actual size of the data stored in storage pool. For example, if the next block is a 4K block and is compressed to a 1K block and stored using 2-way mirroring, then the following information is stored in the block pointer referencing the next block: (i) size=4K, (ii) physical size=1K; (iii) allocated size=2K; and (iv) replication type=2-way mirroring. From the example, those skilled in the art will appreciate that physical size addresses compression while allocated size address replication. Further, those skilled in the art will appreciate that if there is no compression, then the physical size and the size are equal.

Continuing with the discussion of FIG. 6, at this stage, a determination is made about whether the data retrieved corresponds to a data block (Step 606). If the data corresponds to a data block, then the data is extracted from the retrieved blocks and presented to the process requesting the data (Step 608). Alternatively, if the data does not correspond to a data block, then the retrieved blocks correspond to an indirect block. In this case, the replication type, starting location, and the block size of the next block is obtained from the block pointer in the indirect block (Step 610). Subsequently, the physical blocks corresponding to the block size of the next block are retrieved from disk (Step 612). If the retrieved blocks correspond to a data block (Step 606), then the data is extracted and presented to the requesting process (Step 1208). If the retrieved blocks do not correspond to a data block, then Steps 606-612 are repeated until the data block is encountered.

Figure 7:
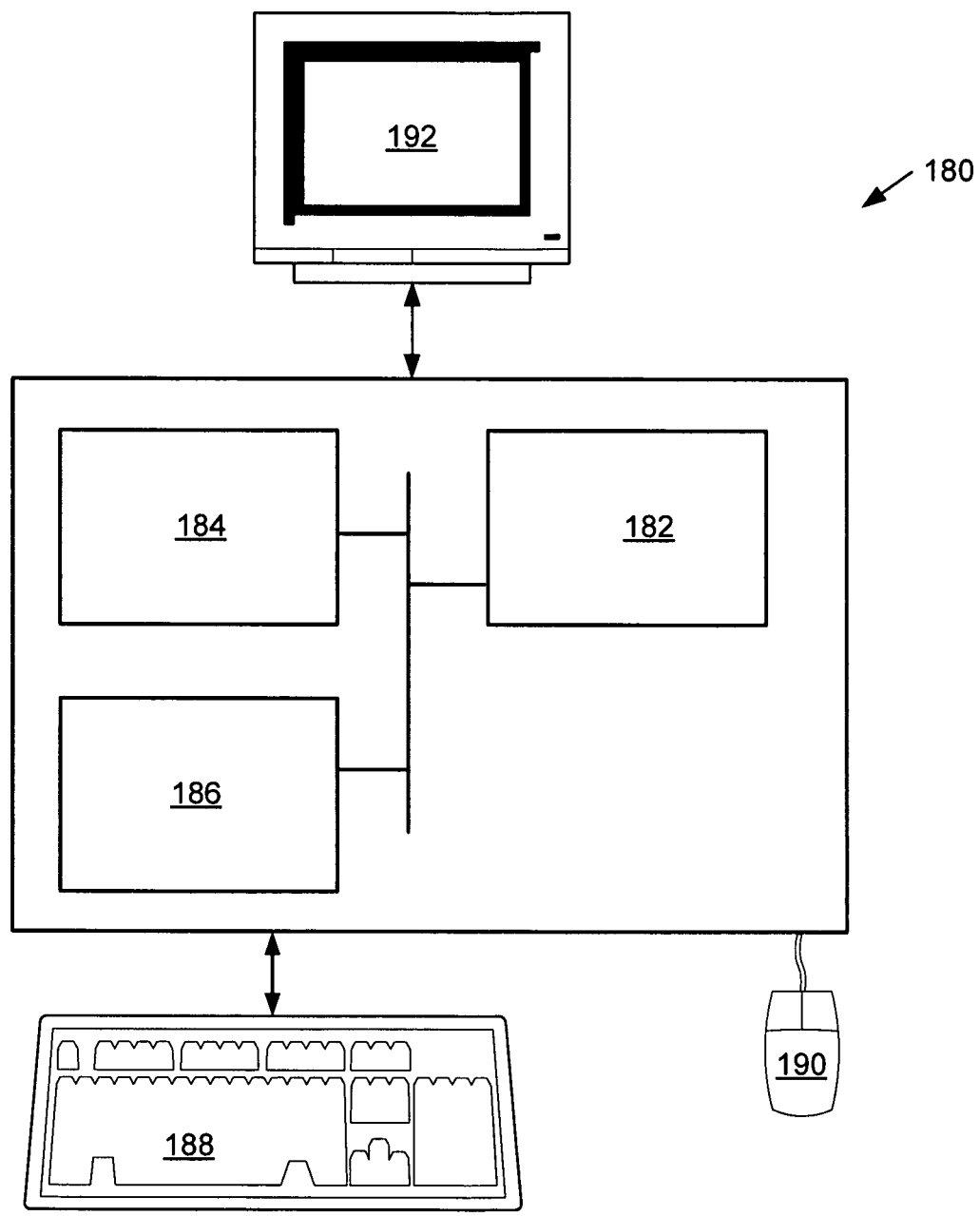
FIG. 7 shows a computer system in accordance with an embodiment of the invention.

The invention may be implemented on virtually any type of computer regardless of the platform being used. For example, as shown in FIG. 7, a networked computer system (180) includes a processor (182), associated memory (184), a storage device (186), and numerous other elements and functionalities typical of today's computers (not shown). The networked computer system (180) may also include input means, such as a keyboard (188) and a mouse (190), and output means, such as a monitor (192). The networked computer system (180) is connected to a local area network (LAN) or a wide area network (e.g., the Internet) (not shown) via a network interface connection (not shown). Those skilled in the art will appreciate that these input and output means may take other forms. Further, those skilled in the art will appreciate that one or more elements of the aforementioned computer (180) may be located at a remote location and connected to the other elements over a network. Further, the invention may be implemented on a distributed system having a plurality of nodes, where each portion of the invention (e.g., the storage pool, the SPA, the DMU, etc.) may be located on a different node within the distributed system. In one embodiment of the invention, the node corresponds to a computer system. Alternatively, the node may correspond to a processor with associated physical memory.

Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for writing data to a storage pool, comprising:
    receiving a first write operation for a first block;
    determining that the first block comprises metadata;
    determining a first replication type for the first block, wherein determining the first replication type comprises:
        determining a class of metadata to which the first block belongs,
        determining that the class of metadata is associated with a class-specific replication policy, and
        using the class-specific replication policy to determine the first replication type;
    writing the first block to the storage pool in accordance with the first replication type;
    receiving a second write operation for a second block;
    determining that the second block does not comprise metadata;
    determining a second replication type for the second block; and
    writing the second block to the storage pool in accordance with the second replication type.

2. The method of claim 1, wherein determining that the first block comprises metadata includes determining that the block is one selected from a group consisting of a root block of the storage pool, a block associated with a global file system metadata, a block associated with a file system in the storage pool, and an indirect block associated with a file.

3. The method of claim 1, wherein the class of metadata corresponds to one selected from a group consisting of a root block class, a global file system metadata class, a file system metadata class, and an indirect block class.

4. The method of claim 1, wherein the first block is associated with a file.

5. The method of claim 4, wherein the file is organized as a hierarchy of blocks and the first block is part of the hierarchy of blocks.

6. A system, comprising:
    a computer processor;
    a storage pool;
    and a file system executing on the computer processor and configured to:
        receive a first write operation for a first block,
        determine that the first block comprises metadata,
        determine a first replication type for the first block;
        write the first block to the storage pool in accordance with the first replication type,
        receive a second write operation for a second block,
        determine that the second block does not comprise metadata,
        determine a second replication type for the second block, and
        write the second block to the storage pool in accordance with the second replication type,
    wherein, to determine the first replication type, the file system is configured to:
        determine a class of metadata to which the first block belongs,
        determine that the class of metadata is associated with a class-specific replication policy, and
        use the class-specific replication policy to determine the first replication type.

7. The system of claim 6, wherein determining that the first block comprises metadata includes determining that the first block is one selected from a group consisting of a root block of the storage pool, a block associated with a global file system metadata, a block associated with a file system in the storage pool, and an indirect block associated with a file.

8. The system of claim 6, wherein the class of metadata corresponds to one selected from a group consisting of a root block class, a global file system metadata class, a file system metadata class, and an indirect block class.

9. The system of claim 6, wherein the first block is associated with a file in the file system.

10. The system of claim 9, wherein the file is organized as a hierarchy of blocks and the first block is part of the hierarchy of blocks of the file system.

11. A non-transitory computer readable storage medium comprising executable instructions for writing data to a storage pool, the executable instructions comprising instructions to:

receive a first write operation for a first block;
determine that the first block comprises metadata;
determine a first replication type for the first block, wherein instructions to
determine the first replication type comprise instructions to:
  determine a class of metadata to which the first block belongs,
  determine that the class of metadata is associated with a class-specific replication policy, and
  use the class-specific replication policy to determine the first replication type;
write the first block to the storage pool in accordance with the first replication type;
receive a second write operation for a second block;
determine that the second block does not comprise metadata;
determine a second replication type for the second block; and
write the second block to the storage pool in accordance with the second replication type.

12. The non-transitory computer readable storage medium of claim 11, wherein instructions to determine that the first block comprises metadata include instructions to determine that the block is one selected from a group consisting of a root block of the storage pool, a block associated with a global file system metadata, a block associated with a file system in the storage pool, and an indirect block associated with a file.

13. The non-transitory computer readable storage medium of claim 11, wherein the class of metadata corresponds to one selected from a group consisting of a root block class, a global file system metadata class, a file system metadata class, and an indirect block class.

14. The non-transitory computer readable storage medium of claim 11, wherein the first block is associated with a file.

15. The non-transitory computer readable storage medium of claim 14, wherein the file is organized as a hierarchy of blocks and the first block is part of the hierarchy of blocks.

* * * * *